Dec. 19, 1944. J. P. WHANN 2,365,314
FLUID CONTROL STARTING GATE
Filed Dec. 17, 1942 3 Sheets-Sheet 1

Inventor:
JESSE P. WHANN,
By
Attorney.

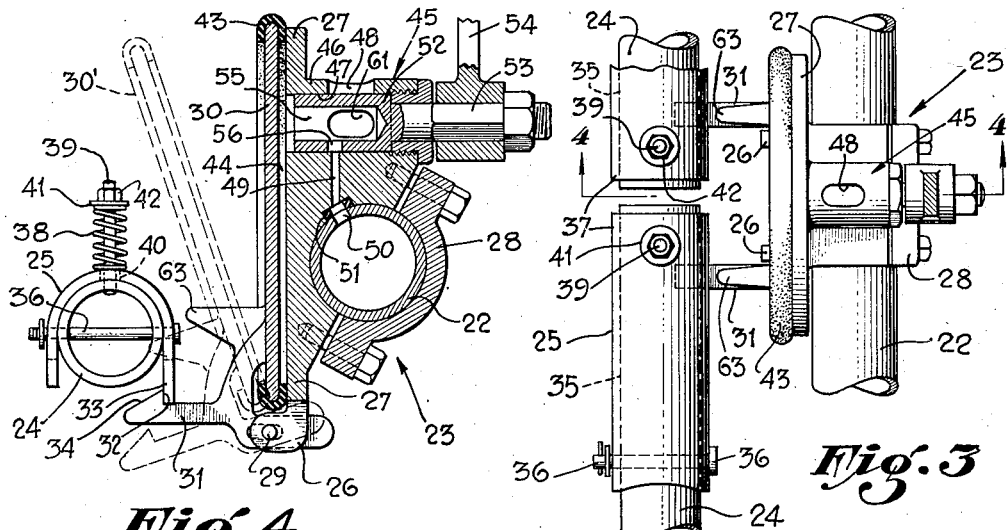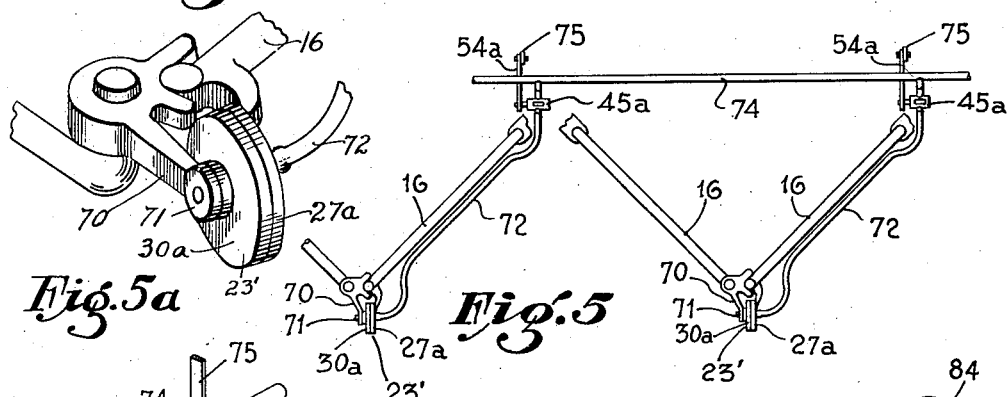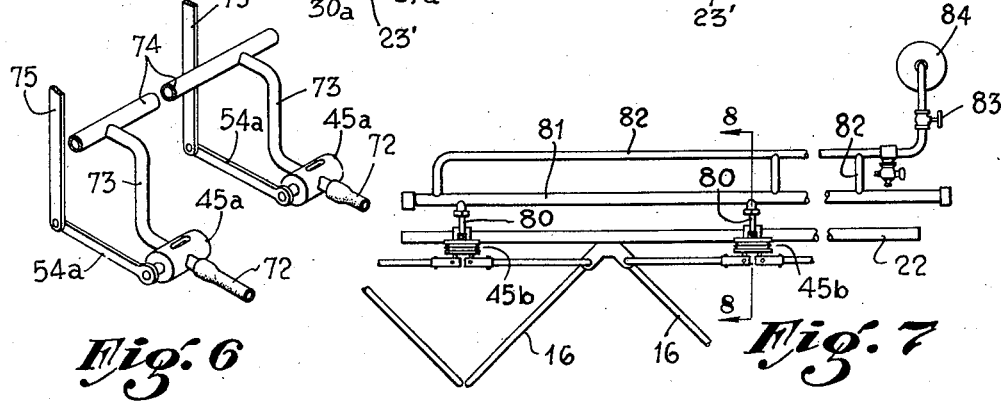

Dec. 19, 1944.  J. P. WHANN  2,365,314

FLUID CONTROL STARTING GATE

Filed Dec. 17, 1942  3 Sheets-Sheet 3

Inventor:
JESSE P. WHANN.
By
Attorney.

Patented Dec. 19, 1944

2,365,314

UNITED STATES PATENT OFFICE 2,365,314

FLUID CONTROL STARTING GATE

Jesse P. Whann, Los Angeles, Calif., assignor to Puett Electrical Starting Gate Corporation, Beverly Hills, Calif., a corporation of California Application December 17, 1942, Serial No. 469,279

16 Claims. (Cl. 119—15.5)

My invention relates to starting gates such as used at race tracks to start animals in races, and relates in particular to a starting gate device having a simplified control of economical construction and low cost of maintenance which does not require use of electricity in its operation.

An object of the invention is to provide a starting gate device having means for simultaneously opening all of the gates, and which has parts in such cooperation that retarded opening of one or more of the gates with relation to the remaining gates is avoided.

It is an object of the invention to provide a starting gate having gate members for closing the forward end of a starting stall, with latch means for holding the gate in closed position, which latch means is actuated by differential pressure obtained through use of a fluid.

It is a further object of the invention to provide a starting gate latch means comprising at least two engageable parts which accomplish latching effect by engagement of shoulders, at least one of the parts being held by differential fluid pressure in operative position, and being movable into releasing position upon release or reduction of the differential fluid pressure.

A further object of the invention is to provide a starting gate device having a plurality of starting gates and a plurality of fluid actuated latch means for holding the gates of the starting gate device in closed position, the cooperating parts being so arranged as to permit individual release of the gates in response to pressure thereagainst by an animal in a starting stall, and so as to be simultaneously released by actuation of a fluid pressure means.

It is a further object of the invention to provide a starting gate device having gates which are held in closed position by vacuum and are released by breaking of the vacuum.

A further object of the invention is to provide a latch device for a starting gate wherein a latch shoulder is held in cooperative relation to a second shoulder by vacuum, with simple means for applying the application and release of the vacuum.

Further objects and advantages of the invention will appear throughout the following part of the specification.

Referring to the drawings which are for illustrative purposes only,

Fig. 3 is an enlarged fragmentary plan view of one of the latch elements, with the gate elements in engagement therewith.

Fig. 4 is an enlarged cross-section taken on a plane represented by the line 4—4 of Fig. 3.

Fig. 5 is a fragmentary sectional view showing a form of the invention wherein the latch means are mounted on the front edges of cooperating gate elements.

Fig. 5a is an enlarged perspective of a gate latch.

Fig. 6 is a fragmentary, condensed, perspective view showing the valve elements and pipe connections of Fig. 5.

Fig. 7 is a schematic view of a fluid pressure released gate latching mechanism in a starting gate structure.

Figure 1:
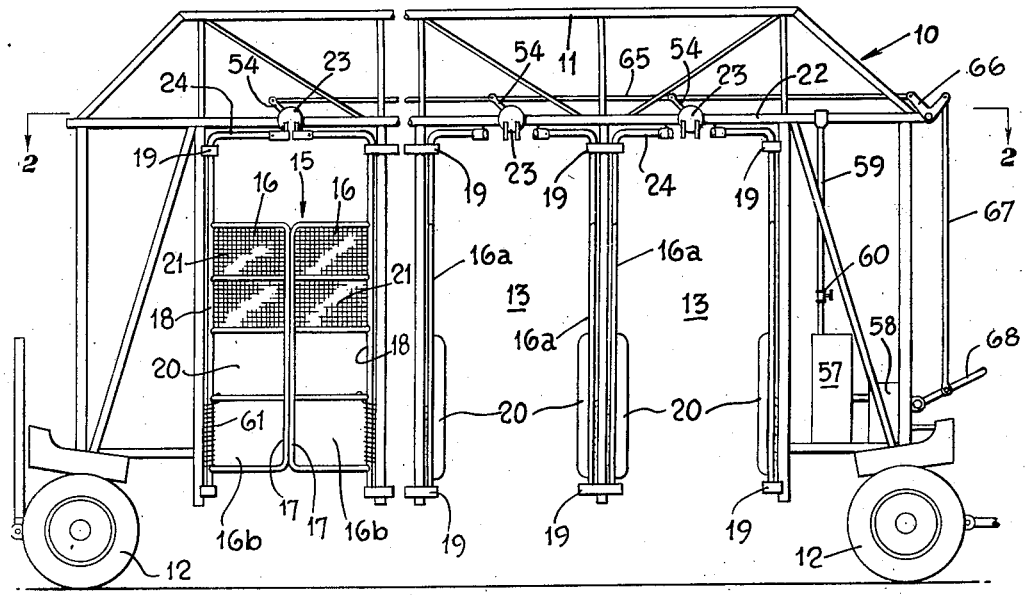
Fig. 1 is a face view of a starting gate device embodying a form of the invention, a central portion of the starting gate structure being removed so as to shorten the view, the view having the gate elements shown in closed and opened position.
Figure 2:
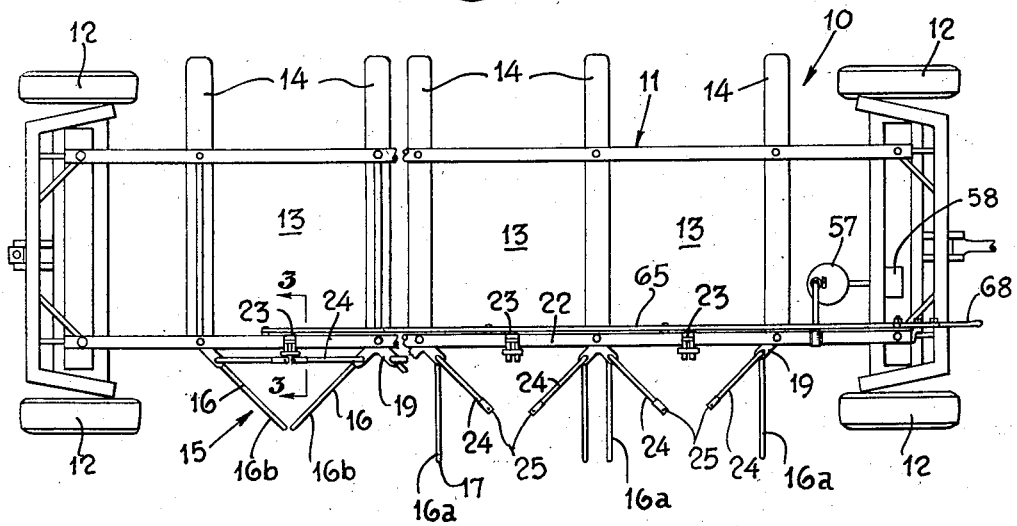
Fig. 2 is a plan sectional view taken on the line 2—2 of Fig. 1.

In Figs. 1 and 2 I have shown a starting gate device 10 which includes a frame structure 11 of welded tubular parts, this frame structure 11 having wheels 12 at the ends thereof whereby it may be rolled on and off the race track. The structure 11 has a plurality of stalls 13 defined by padded substantially parallel walls 14.

Gate means 15 are provided at the forward ends of the stalls 13 to obstruct or close them, such gate means preferably comprising a pair of gates 16 hinged on vertical axes so that they will be swingable between opened positions 16a in which they are substantially parallel, as shown in Fig. 2, to closed positions 16b wherein they lie in diagonal planes, with the forward edges 17 thereof meeting forwardly of the hinge axes.

The gates 16 may be made from steel tubing, with a tube 18 vertically disposed at the outer end of each so as to provide a shaft or axle element which may be received by bearings 19 in which the gates 16 can swing between the opened and closed positions hereinabove set forth. The lower portion of each gate 16 is shown with an opaque padded wall 20, and above this wall 20 there may be a screen 21 at a level with the heads of the horses and jockeys. The gate structure 11 includes a horizontal frame member 22 which extends above the forward portions of the stalls 13. On this lateral member 22 there are latch means 23 preferably disposed on the central vertical plane of the stalls 13. Each gate 16 has a structural part or arm 24 carrying an engagement member 25. These structural parts 24 comprise arms which project laterally from the upper ends of the vertical tubes or axles 18, and the arms 24 and the engagement members 25 are so positioned that when the gates 16 are swung from opened positions 16a to closed positions 16b, the arms 24 will carry the engagement members 25 into latched engagement with the cooperating parts of the latch means 23 in the manner hereinafter described with relation to Fig. 4. The arms 24 extend from the upper ends of the shaft portions 18 of the gates 16 in such angular relation to the planes defined by the gates 16 that when the gates are moved into closed position, as shown at 16b of Fig. 2, the arms 22 will be substantially parallel to the frame member 22.

As shown in Figs. 3 and 4, each latch means 23 comprises a body or plate 27 having a split clamp 28 whereby it may be secured to the horizontal frame member 22. At the lower portion of the plate 27 there are brackets 26 carrying a horizontal hinge pin 29 to swingably support a plate 30 and an associated latch member 31. When the plate 30 is in the position thereof shown in Fig. 4, the lever or engagement member 31 will be held substantially horizontal so that a latching shoulder 32 at the forward end thereof will be positioned for engagement by the shoulder 33 of the engagement member 25 carried by the arm 24.

The engagement members 25 are characterized by yieldability in upward direction so that they will rid over the sloping approaches 34 of the levers 31 leading into the latching shoulders 32, when the gates are swung into closed position and the arms 24 are swung into the positions in which they are shown in Figs. 3 and 4 parallel to the horizontal structural member 22. These yieldable engagement members 25 comprise steel channels which fit over the end portions 35 of the arms 24, and are swingably mounted upon horizontal pins 36 carried by the arms 24. The forward ends 37 of the members 25 may swing upward about the pins 36 against the yieldable pressure exerted by springs 38 disposed near the forward ends 37 of the latching members 25. The springs 38 surround vertical screws 39 which project upward from the arms 24, through openings 40 in the upper walls of the members 25. The springs 38 are placed under compression by washers 41 disposed at the upper ends thereof, which washers are adjustably secured on the screws 39 by nuts 42.

Annular gasket means are provided between the peripheral portions of the plates 27 and 30, such gasket means being shown as an annular rubber channel 43 held by tension on the periphery of the plate 30. When the plate 30 is in vertical position parallel to the plate 27, as shown in Figs. 3 and 4, a vacuum space 44 is formed between the plates 27 and 30. This vacuum space 44 is exhausted to a desired extent by the following means. Each plate 27 is provided with a valve device 45 by which the front face thereof, and the vacuum space 44, may be connected either with a vacuum system or with the open atmosphere or source of air under pressure. The valve means 45 comprises a wall 46 having a cylindric bore 47. The wall 46 has a large port 48 which communicates to atmospheric pressure and a small port or passage 49 which communicates with a port 50 in the pipe 22, there being a rubber ring 51 to seal around the juncture of the ports 49 and 50. A valve plug 52 is rotatably disposed in the the valve bore 47, this valve plug 52 having a projecting squared stem 53 on which a lever 54 is fixed. The valve plug 52 has a central opening 55 leading inward from the leftward or front end thereof and a small port 56 which connects this opening 55 with the port or passage 49 when the plug 52 is in the position shown in Fig. 4. The interior of the pipe 22 is connected to an exhausting means, such as a small vacuum tank 57 and associated pump 58, as shown in Fig. 1, by means of a duct 59 having a valve 60 therein. The suction or partial vacuum, accordingly, will be transmitted through the pipe 22, the ports 50 and 49, and the port 56 to the space 44, producing in the space 44 a partial vacuum so that there will be a pressure differential applied to the plate 30 to hold the same in the erect position shown in Fig. 4, such pressure differential being the difference between atmospheric pressure and the partial vacuum in the space 44. This partial vacuum may in ordinary practice be in the neighborhood of one pound per square inch. This value, however, will vary with the area of the plate 30 exposed to pressure differential. The valve plug 52 has a larger port 61 communicating with the opening 55 and being positioned so that when the plug 52 is rotated through an angle of about 90°, it will align with the port 48, thus opening the space 44 to the exterior, to break the partial vacuum and equalize the pressure on opposite sides of the plate 30, permitting the plate 30 to drop outward into the position shown by dotted lines 30', and permitting the latch element to drop into a position indicated by dotted lines. Whereupon the gates 16, held by the latch, may be swung into open position by torsional springs such as those shown at 61 in Fig. 1.

When the plate 30 is in diagonal position, as shown at 30' in Fig. 4, it may be lifted into erect position upon closing of either of the gates 16 to be latched thereby, by engagement of one of the latching members 25 with one of the outwardly projecting lugs 63. It will be noted that the levers 31 and the latching shoulders 32 are positioned above the horizontal plane of the pin 29, so that an outward or leftward force applied to the gate will transmit to the lever 31 and the plate 30 an eccentric force tending to rotate the same into open position 30' against the suction acting in the space 44. The force which must be applied by an animal against the gate to open the same is controlled by the pressure differential existing on opposite sides of the plate 30, and this pressure differential may be varied by changing the pressure in the suction system.

As shown in Fig. 1 the levers 54 of the latch devices 23 are interconnected by means of a horizontal link 65. One end of this link 65 is connected to a bell crank 66 which is connected in turn through a link 67 with an operating lever 68. When this operating lever 68 is swung from the position in which it is shown in Fig. 1, downward through an angle of approximately 90°, all of the valve devices 45 will be simultaneously operated so as to break the vacuum substantially instantaneously in all of the latch devices 23, so that there will be a simultaneous opening of the gates 16.

In the form of my invention shown in Figs. 5 and 6, the latching device 23' is mounted on the forward edges of the gates 16. The latching device 23' comprises a plate 27a analogous to the plate 27 of Fig. 4. This plate 27a is mounted on one of the gates 16, and on the other gate of each pair a plate 30a is mounted by means of a bracket 70 having a yieldable joint 71 such as shown in Fig. 5a at its outer end for support of the plate 30a, which is analogous to the plate 30 of Fig. 4. A flexible hose 72 connects the front face of each plate 27a with a valve device 45a of the same type as shown in Fig. 4, such valve device being operable to connect the flexible tube 72 with a riser piper 73 which in turn communicates with a header 74 carried in the superstructure of the starting gate device. The levers 54a, associated with the valve devices 45a, may be simultaneously operated through use of links 75 so as to open the valves to external atmosphere, thereby breaking the vacuum existing between the plates 27a and 30a through the flexible tubes 72, whereupon these plates 27a and 30a may separate and permit the gates 16 to swing open.

The invention also comprehends the control of the fluid pressure in all of the latch devices from a single valve instead of by use of a plurality of valves 45 or 45a.

Figure 8:
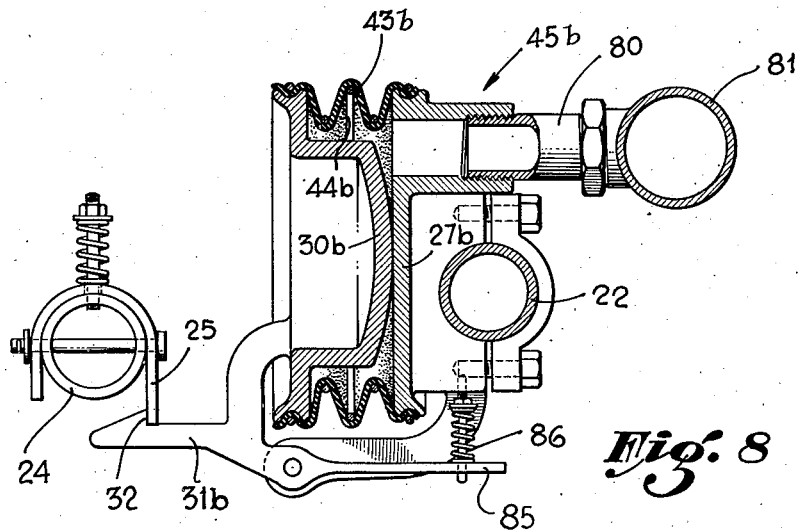
Fig. 8 is an enlarged fragmentary cross-sectional view taken as indicated by the line 8—8 of Fig. 7.

In Fig. 7 I schematically indicate a plurality of gates 16 held in closed position by fluid pressure actuated latch devices 45b connected through nipples 80 with a header pipe 81. Piping 82 and a control valve 83 connect this header with a fluid pressure source 84, such as a tank of compressed air or carbon dioxide. As shown in Fig. 8, each latch device 45b comprises a plate or body 27b of the general character of the body 27 shown in Fig. 4. In cooperative relation to the body 27b there is a body 30b, the periphery of which is connected to the periphery of the body 27b by a bellows or expansible wall 43b, defining a chamber 44b. The plate 30b is integrally formed with a latching lever 31b, and an arm 85 is extended rearward therefrom to receive pressure of an adjustable spring 86 which rotates the lever 31b and the plate 30b into the position thereof shown in Fig. 8, wherein a latch member 25 associated with an arm 24 of a gate may engage the latching shoulder 32 of the lever 31b. When it is desired to simultaneously release all of the latching devices, the valve 83, Fig. 7, is opened to permit fluid under pressure to pass from the supply represented by the tank 84 into the manifold 81 from which this pressure will be transmitted through the nipples 80 into the chambers or spaces 44b of the latching devices 45b, moving the walls or plates 30b in leftward direction so as to shift the latching shoulders 32 downward out of engagement with the engagement members 25, whereupon the gates 16 of Fig. 7 may be swung into open position.

It will be understood that suitable means is provided to relieve the pressure within the chamber defined by the walls 30b and 27b such as the manually operated bleeder valve D so that the parts may be manually returned to the position shown in Figure 8, assisted by spring 86.

Figure 9:
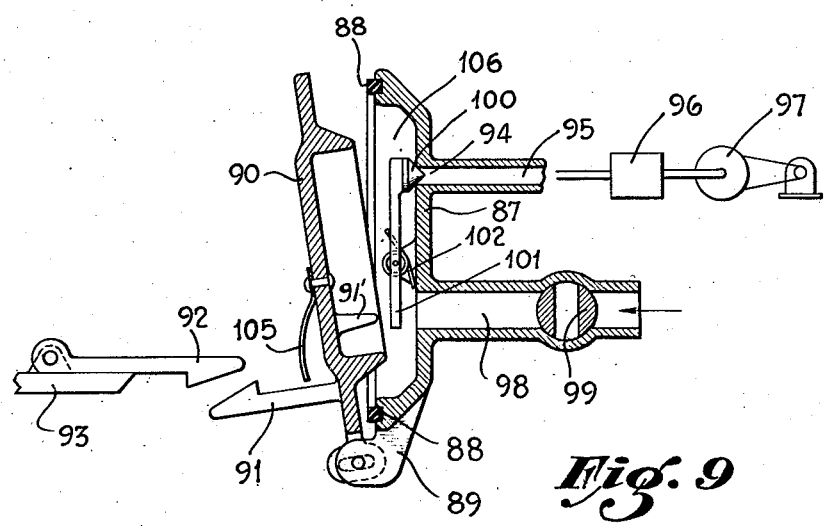
Fig. 9 is a cross-sectional view showing a modified form of my pressure differential actuated latch mechanism.

A further feature of the invention is the provision of means for closing the vacuum port of a latch device of the general character shown in Fig. 3 when the device is in released condition. In Fig. 9 I show a modified form of my invention which may be substituted for that disclosed in Figure 4. This modified structure comprises a latch device comprising a plate 87 which supports a sealing ring 88, and by means of a hinge 89 carries a swingable plate 90 having a projecting latch 91 for engagement with a latch element 92 associated with a gate structure 93. In the back wall of the plate 87 there is a port 94 communicating with an exhaust passage 95 which leads to a vacuum tank 96 in which a partial vacuum is produced by a pump 97. A duct 98 also passes through the wall of the plate 87 and is equipped with a valve 99 which may be rotated so as to open the duct 98 to atmospheric pressure. A valve 100 is carried by a lever 101 in a position to close the vacuum port 94, there being a spring 102 normally swinging the lever 101 so as to move the valve 100 into a position to close the port 94. The plate 90 is provided with a projection 91' to engage the lower end of the lever 101 when the plate 90 is swung rightward from the open position in which it is shown in Fig. 9 by pressure of the end of the latch element 92 against a spring 105 mounted on the outer face of the plate 90. The projection 91' causes rotation of the lever 101 in counterclockwise direction so as to open the valve 100 when the plate 90 is moved into closed relation to the plate 87. This opens the communication between the space 106 with the source of partial vacuum so that the plate 90 will be held against the sealing ring 88.

I claim as my invention:

1. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum in said chambers; and means operative to simultaneously break the partial vacuum in all of said chambers whereby the said walls of all of said latch means will move apart and simultaneously effectuate release of all of said gates.

2. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum in said chambers; and means operative to simultaneously reduce the partial vacuum in all of said chambers whereby the said walls of all of said latch means will move apart and simultaneously effectuate release of all of said gates.

3. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means operative in consequence of the closing of said gates to move said walls into said positions of relative proximity; means to create a partial vacuum in said chambers; and means operative to simultaneously break the partial vacuum in all of said chambers whereby the said walls of all of said latch means will move apart and simultaneously effectuate release of all of said gates.

4. In a starting gate device of the character described, the combination of: a gate structure having a plurality of animal compartments, said compartments having egress openings; gates for said openings arranged to move from closed to open position; latch means for holding said gates in closed position, each of said latch means comprising a pair of separate relatively movable walls which when moved from a spaced position to positions of relative proximity will define a vacuum chamber wherein vacuum will act to hold said walls in positions of relative proximity, the movement of said walls apart effectuating the release of the gate associated therewith; means operative in consequence of the closing of said gates to move said walls into said positions of relative proximity; means to create a partial vacuum in said chambers; and means operative to simultaneously break the partial vacuum in all of said chambers whereby the said walls of all of said latch means will move apart and simultaneously effectuate release of all of said gates.

5. In a starting gate device of the character described, the combination of: a gate structure having a plurality of animal compartments, said compartments having egress openings; gates for said openings arranged to move from closed to open position; latch means for holding said gates in closed position, each of said latch means comprising a wall member mounted upon said gate structure, a second wall member in movable relation to said first wall member, means to seal the peripheries of said wall members so as to form a vacuum chamber, and means to latch and unlatch a gate in response to movement of said second wall relative to said first wall; means to create a partial vacuum in said chambers; and means operative to simultaneously break the partial vacuum in all of said chambers whereby the said walls of all of said latch means will move apart and simultaneously effectuate release of all of said gates.

6. In a starting gate device of the character described, the combination of: a gate structure having a plurality of animal compartments, said compartments having egress openings; gates for said openings arranged to move from closed to open position; latch means for holding said gates in closed position, each of said latch means comprising a wall member mounted upon said gate structure, a second wall member in movable relation to said first wall member, means to seal the peripheries of said wall members so as to form a vacuum chamber, and means to latch and unlatch a gate in response to movement of said second wall relative to said first wall, said last named means comprising a latch part carried by said second wall and a latch part carried by said gate, said parts having cooperating shoulders, and one of said parts being yieldable so that said parts may move into latching engagement at any time said gate is moved into closed position; means to create a partial vacuum in said chambers; and means operative to simultaneously break the partial vacuum in all of said chambers whereby the said walls of all of said latch means will move apart and simultaneously effectuate release of all of said gates.

7. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum in said chambers; a plurality of valves arranged along said gate structure in operative proximity to said chambers and being connected thereto; and means for simultaneously opening said valves so as to break the partial vacuum in all of said chambers whereby the said walls of all of said latch means will move apart and simultaneously effectuate release of all of said gates.

8. In a starting gate device of the character described, the combination of: a gate structure having a plurality of animal compartments, said compartments having egress openings; gates for said openings arranged to move from closed to open position; latch means for holding said gates in closed position, each of said latch means comprising a wall member mounted upon said gate structure, a second wall member in movable relation to said first wall member, means to seal the peripheries of said wall members so as to form a vacuum chamber, and means to latch and unlatch a gate in response to movement of said second wall relative to said first wall, said last named means comprising a latch part carried by said second wall and a latch part carried by said gate, said parts having cooperating shoulders, and one of said parts being yieldable so that said parts may move into latching engagement at any time said gate is moved into closed position; means to create a partial vacuum in said chambers; a plurality of valves arranged along said gate structure in operative proximity to said chambers and being connected thereto; and means for simultaneously opening said valves so as to break the partial vacuum in all of said chambers whereby the said walls of all of said latch means will move apart and simultaneously effectuate release of all of said gates.

9. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum in said chambers; a plurality of valves arranged along said gate structure in operative proximity to said chambers and being connected thereto; lever means extending from each of said valves to operate the same; and linkage means extending along said gate structure and being connected to said lever means, whereby said levers may be moved in a single operation to simultaneously open said valves so as to break the partial vacuum in all of said chambers whereby the said walls of all of said latch means will move apart and simultaneously effectuate release of all of said gates.

10. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum; valve means to connect said chamber to said partial vacuum; and means operative to simultaneously break the partial vacuum in all of said chambers whereby the said walls of all of said latch means will move apart and simultaneously effectuate release of all of said gates.

11. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum; valve means to connect said chamber to said partial vacuum; a plurality of valves arranged along said gate structure in operative proximity to said chambers and being connected thereto; and means for simultaneously opening said valves so as to break the partial vacuum in all of said chambers whereby the said walls of all of said latch means will move apart and simultaneously effectuate release of all of said gates.

12. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum; valve means to connect said chamber to said partial vacuum; a plurality of valves arranged along said gate structure in operative proximity to said chambers and being connected thereto; lever means extending from each of said valves to operate the same; and linkage means extending along said gate structure and being connected to said lever means, whereby said levers may be moved in a single operation to simultaneously open said valves so as to break the partial vacuum in all of said chambers whereby the said walls of all of said latch means will move apart and simultaneously effectuate release of all of said gates.

13. In a starting gate device of the character described, the combination of: a gate structure having a plurality of animal compartments, said compartments having egress openings; gates for said openings arranged to move from closed to open position; latch means for holding said gates in closed position, each of said latch means comprising relatively movable walls to define a vacuum chamber wherein vacuum will act to hold said walls in positions of relative proximity, the movement of said walls apart effectuating the release of the gate associated therewith; means to create a partial vacuum; valve means to connect said chamber to said partial vacuum; a plurality of valves arranged along said gate structure in operative proximity to said chambers and being connected thereto; and means for simultaneously closing said valves so as to break the partial vacuum in all of said chambers whereby the said walls of all of said latch means will move apart and simultaneously effectuate release of all of said gates.

14. In a starting gate device, a latch means comprising: a first wall member; a second wall member movably associated with said first wall member so as to be moved toward and away therefrom; means to form a seal between the peripheral portions of said wall members when they are close together; a source of partial vacuum, valve means operative in response to movement of said wall members together to connect the space between said wall members with said source of partial vacuum; valve means operative to connect said space with atmospheric pressure; and a latch part arranged to be moved by said second wall member.

15. In a starting gate device, a latch means comprising: a first wall member; a second wall member movably associated with said first wall member so as to be moved toward and away therefrom; means to form a seal between the peripheral portions of said wall members when they are close together; a source of partial vacuum, valve means operative when in one position to connect the space between said wall members with said source of partial vacuum and when in another position to connect said space with the atmosphere, to break the vacuum in said space and permit said wall members to swing apart; and a latch part arranged to be moved by said second wall member.

16. In a starting gate device of the character described, the combination of: a gate structure having a plurality of animal compartments, said compartments having egress openings; gates for said openings arranged to move from closed to open position; latch means for holding said gates in closed position, each including a chamber comprising a plurality of members one member of which is movable relative to another member, said movable member including a latch part, whereby fluid pressure differential in the chamber relative to the exterior of the chamber will act to hold said members in a relative position to each other effecting the holding of the gate associated therewith in closed position, said members being so arranged that movement thereof into another position will effectuate release of the gate; means to create said pressure differential in each of said chambers; and means operative to simultaneously change the pressure differential in each of said chambers whereby said movable member of said latch chamber and said latch part connected thereto will move into said other position and simultaneously effect release of all of said gates.

JESSE P. WHANN.